(12) United States Patent
Park et al.

(10) Patent No.: US 7,181,185 B2
(45) Date of Patent: Feb. 20, 2007

(54) APPARATUS AND METHOD FOR PERFORMING CHANNEL ESTIMATIONS USING NON-LINEAR FILTER

(75) Inventors: Jung-Keun Park, Seoul (KR); Joong-Hoo Park, Kyungki-do (KR)

(73) Assignee: Pantech Co., Ltd., Seoul (KR)

( * ) Notice: Subject to any disclaimer, the term of this patent is extended or adjusted under 35 U.S.C. 154(b) by 287 days.

(21) Appl. No.: 10/737,223

(22) Filed: Dec. 16, 2003

(65) Prior Publication Data

US 2004/0248541 A1 Dec. 9, 2004

(30) Foreign Application Priority Data

Jun. 3, 2003 (KR) .................. 10-2003-0035580

(51) Int. Cl.
*H04B 1/00* (2006.01)
*H04Q 7/20* (2006.01)
(52) U.S. Cl. ...................... 455/306; 455/464
(58) Field of Classification Search ................ 455/306, 455/307, 464, 103; 375/147, 316, 130; 370/342
See application file for complete search history.

(56) References Cited

U.S. PATENT DOCUMENTS

| | | | | |
|---|---|---|---|---|
| 6,192,040 | B1 * | 2/2001 | Jalloul et al. ................ | 370/335 |
| 6,304,624 | B1 | 10/2001 | Seki et al. | |
| 6,452,917 | B1 | 9/2002 | Leung | |
| 6,947,475 | B2 * | 9/2005 | Sendonaris et al. ......... | 375/148 |
| 2003/0108135 | A1 * | 6/2003 | Frigon ......................... | 375/354 |

FOREIGN PATENT DOCUMENTS

| KR | 2000-7189 | 2/2000 |
|---|---|---|
| KR | 2001-54456 | 7/2001 |

OTHER PUBLICATIONS

Jung-Keun Park, et al., "A Channel Estimation Technique for WCDMA Systems", IEICE Trans. Commun., vol. E86-B, No. 4, Apr. 2003.
Jung-Keun Park, "A New Channel Estimation Technique Using Plot Symbols", Electric Engineering and Computer Science in Hanyang University, Dec. 2002, Only Abstract in English.

* cited by examiner

*Primary Examiner*—Aung Moe
(74) *Attorney, Agent, or Firm*—Knobbe, Martens, Olson and Bear, LLP

(57) ABSTRACT

A channel estimation apparatus for WCDMA mobile communication terminal is disclosed. The channel estimation apparatus includes a moving average filter for calculating the average value of pilot signals; an interpolator for computing a tentative estimation value of channel variation by using linear interpolation algorithms based on the average value of pilot signal; a channel compensator for compensating a channel variable of the data signal delayed in a predetermined time based on the tentative estimation value of channel variation; a decision block unit for tentatively determining data signal based on the compensated data signals; a raw channel estimator for computing a raw channel estimation value based on the output signal of the decision block unit and the data signal delayed; and a non-linear filter for computing a final channel estimation value of channel variation based on the tentative estimation value of channel variation and the raw channel estimation value.

6 Claims, 6 Drawing Sheets

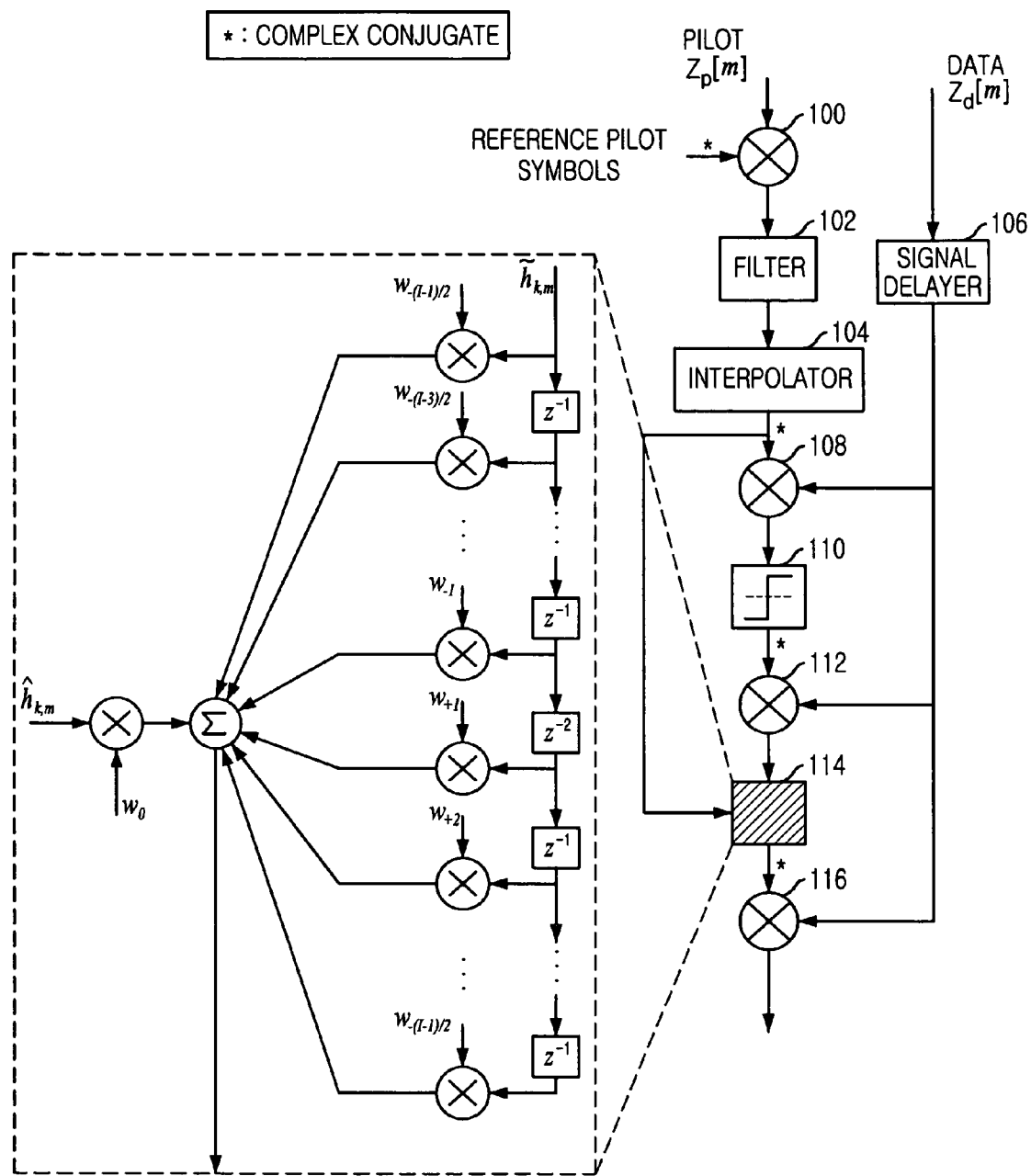

APPARATUS AND METHOD FOR PERFORMING CHANNEL ESTIMATIONS USING NON-LINEAR FILTER

BACKGROUND OF THE INVENTION

1. Field of the Invention

The present invention relates to a channel estimation apparatus and method for Wideband Code Division Multiple Access (WCDMA) mobile communication terminals; and, more particularly, to an apparatus and method for channel estimation using a combination of Pilot Aided Decision Directed (PADD) algorithms and a non-linear filter.

2. Description of Related Art

In general, a forward system of Wideband CDMA has a channel structure in which data signals and pilot signals are time-multiplexed in communication channels of timeslot unit in order to increase its capacity. Accordingly, two of best-known channel estimation methods for a communication system with time-multiplexed data signals and pilot signals are Pilot-Aided (PA) algorithms and Decision-Directed (DD) algorithms.

FIG. 1 is a view of a diagram illustrating a channel estimation apparatus based on conventional PA algorithms.

There are several typical PA algorithms such as a Wiener Filtering, a Low-order Gaussian Interpolation, a Weighted Multi-Slot Averaging (WMSA), a High-order Interpolation and Linear Interpolation algorithms.

The PA algorithms in low-speed fading environments give a relatively high performance. However, the performance of the PA algorithms is decreased in high-speed fading environments. It is because a pilot signal of next slot is required for channel estimation so there is one time slot delay occurred for waiting for arriving next slot.

On the other hand, the DD algorithms outperform the PA algorithms due to the fact that the channel information carried by data signals is used in the calculation of the channel estimate. Nonetheless, the performance of the DD algorithms degrades in a case that decision errors are propagated.

To overcome the above-mentioned shortcomings, a Pilot-Aided Decision Directed PADD algorithm has been introduced. The PADD algorithm is a combination of PA algorithms and DD algorithms.

FIG. 2 is a view of a diagram illustrating a channel estimation apparatus based on conventional PADD algorithms.

In the PADD algorithm, preliminary channel estimation and data are decided at first by using a Linear Interpolation algorithm. After that, final channel estimation and data are obtained based on the channel information of data signals.

In the PADD algorithms, since channel estimations are performed by using data signals and pilot signals, the performance degradation and the propagation of decision error can be prevented. Therefore, the PADD algorithms perform better than Linear Interpolation algorithms and DD algorithms.

However, the PADD algorithms still has a time-delaying problem as PA algorithms and the implementation of the algorithms is more complex.

SUMMARY OF THE INVENTION

It is, therefore, an object of the present invention to provide a channel estimation apparatus and method for Wideband Code Division Multiple Access (WCDMA) mobile communication terminals; and, more particularly, to an apparatus and method for channel estimation using a combination of Pilot Aided Decision Directed (PADD) algorithms and a non-linear filter.

In accordance with an aspect of the present invention, there is provided an apparatus for channel estimation by using a non-linear filter, including: a multiplier for multiplying an input signal by a reference pilot signal; a filter for calculating the average value of pilot signals; an interpolator for computing a tentative estimation value of channel variation by using linear interpolation algorithms based on the average value of pilot signal; a tentative channel estimation compensator for compensating a channel variable of the data signal delayed in a predetermined time based on the tentative estimation value of channel variation; a decision block unit for tentatively determining a sign of data signal based on the compensated data signals; a raw channel estimator for computing a raw channel estimation value based on the output signal of the decision block unit and the data signal delayed in a predetermined time; and a non-linear filter for computing a final channel estimation value of channel variation based on the tentative estimation value of channel variation and the raw channel estimation value.

In accordance with another aspect of the present invention, there is provided a method for making channel estimations using a non-linear filter, the method including the steps of: a) calculating the average value of pilot signals; b) computing a tentative estimation value of channel variation by using a linear interpolation algorithms; c) compensating the channel variation of the data signal delayed in a predetermined time based on the tentative estimation value of channel variation; d) tentatively determining a sign of data signal based on the compensated data signal; e) computing a raw channel estimation value based on the data signal delayed in a predetermined time; and f) computing the final channel estimation value of channel variation using a non-linear filter based on the tentative estimation value of channel variation and the raw channel estimation value.

BRIEF DESCRIPTION OF THE DRAWINGS

The above and other objects and features of the present invention will become apparent from the following description of the preferred embodiments given in conjunction with the accompanying drawings, in which:

FIG. 5 is a diagram illustrating a channel estimation apparatus in accordance with a preferred embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
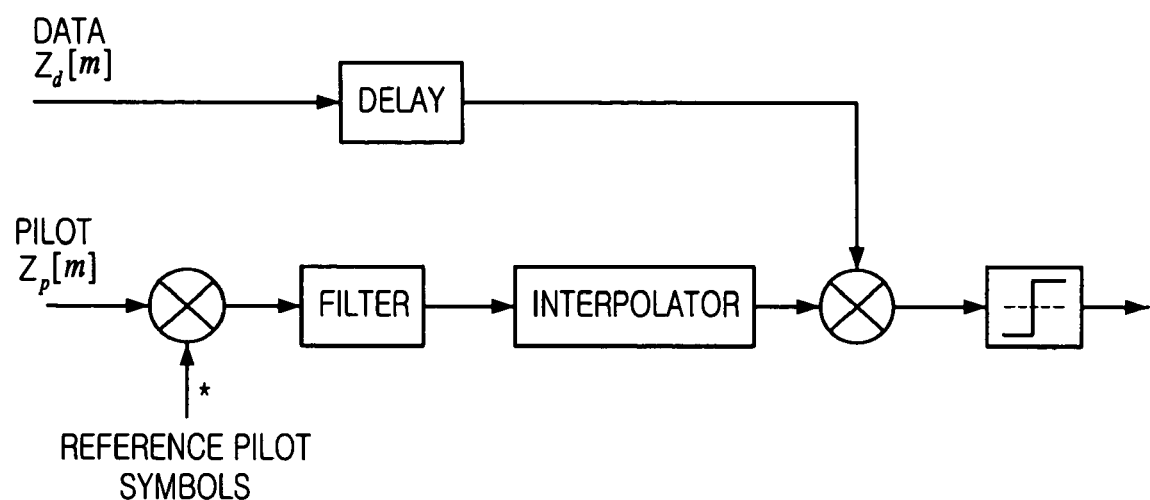
FIG. 1 is a diagram illustrating a channel estimation apparatus based on conventional PA algorithms.
Figure 2:
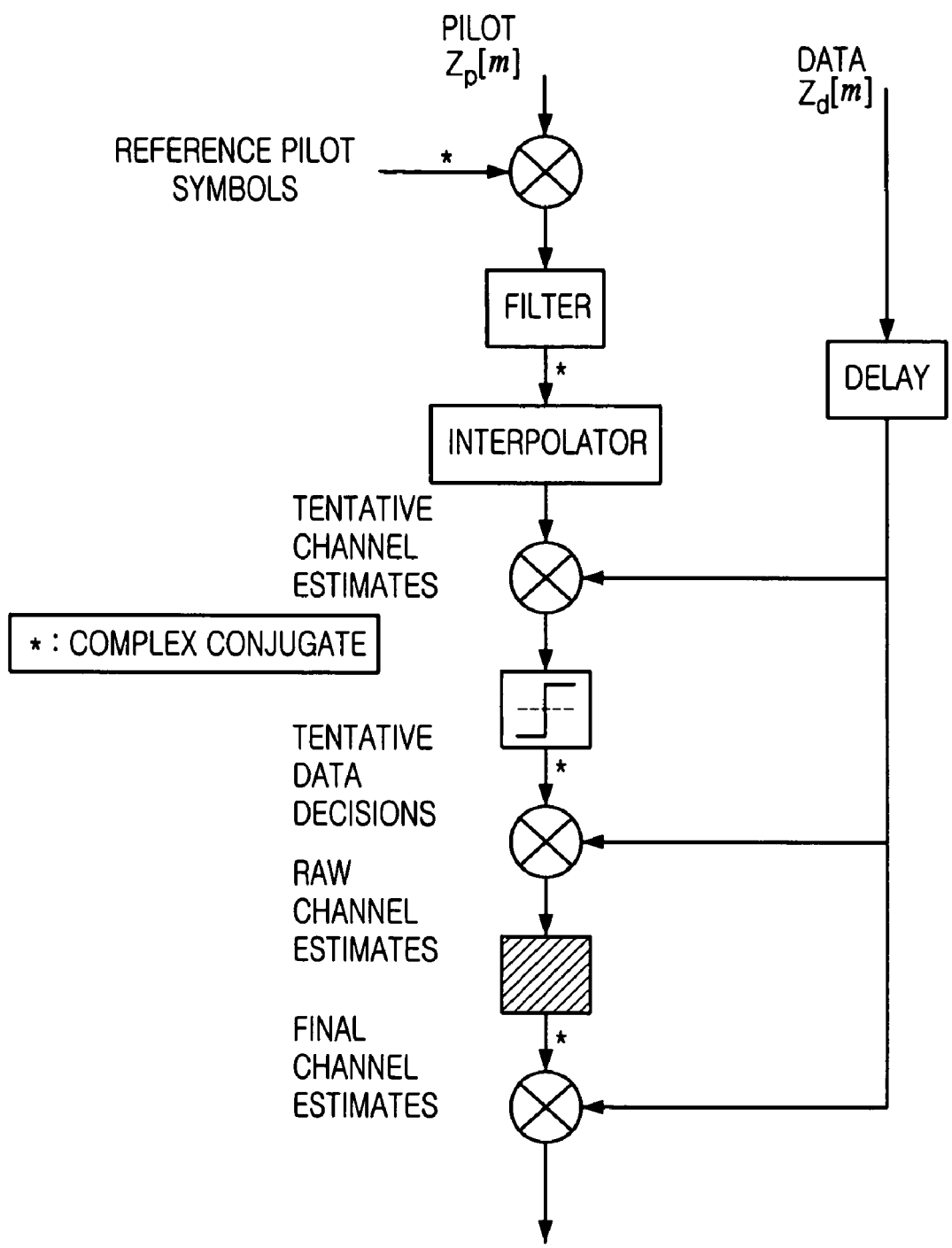
FIG. 2 is a diagram showing a channel estimation apparatus based on conventional PADD algorithms.
Figure 3:
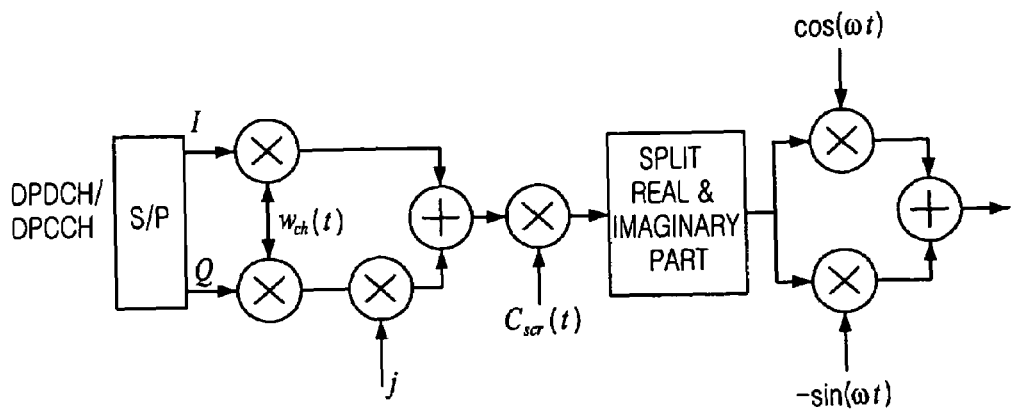
FIG. 3 is a diagram depicting a transmitter of a WCDMA forward system in accordance with a preferred embodiment of the present invention.

FIG. 3 is a diagram illustrating a transmitter of a WCDMA forward system. Referring to FIG. 3, a signal is transmitted to a receiver passing through a series of operation steps including spreading, scrambling and carrier modulation.

Let b(t) be binary data to be transmitted at time t. The binary data can then be expressed as:

$$b(t) = \sum_{m=0}^{N_d/2-1} (b_d^I[m] + b_d^Q[m])P_b(t-mT_b) + \sum_{m=0}^{N_p/2-1} (b_p^I[m] + jb_p^Q[m])P_b(t-mT_b),$$

$$b_d^I[m], b_d^Q[m], b_p^I[m], b_p^Q[m] \in \{\pm 1\}$$

Eq. 1

In Eq. 1, $T_d$ is bit duration, $b_d^I[m]$ and $b_d^Q[m]$ are the in-phase and quadrature-phase components of data signals respectively, and $b_p^I[m]$ and $b_p^Q[m]$ are in-phase and quadrature-phase components of pilot signals respectively. $N_d$ and $N_p$ are the number of sequence corresponding to data signals $b_d[m]$ and pilot signals $b_p[m]$ respectively. $P_b(t)$ is a unit rectangular pulse.

The in-phase and quadrature-phase of data signals and pilot signals spreads according to its own channelization code $w_{ch}(t)$. Assume that the channelization code is a unit rectangular pulse wherein the duration of a chip is $T_c$. The scrambling process of the spread signal is governed by the complex-valued scrambling code expressed as:

$$C_{scr}[m] = C_{scr}^I[m] + jC_{scr}^Q[m]$$

Eq. 2

Therefore, an output of the transmitter in a WCDMA forward system within baseband can be expressed as:

$$x(t) = \sum_{m=0}^{N_b/2-1} (b_d^I[m] + jb_d^Q[m])S_{m,d}(t-mT_b) + \sum_{m=0}^{N_p/2-1} (b_p^I[m] + jb_p^Q[m])P_{m,p}(t-mT_b) =$$

$$x_d(t) + x_p(t)x(t) = \sum_{m=0}^{N_d/2-1} (b_d^I[m] + jb_d^Q[m])S_{m,b}(t-mT_b) + \sum_{m=0}^{N_p/2-1} (b_p^I[m] + jb_p^Q[m])P_{m,b}(t-mT_b)$$

Eq. 3

In Eq. 3, $b_d^I[m]+jb_d^Q[m]$ is the transmitted complex data signals at time m, $b_p^I[m]+jb_p^Q[m]$ is the transmitted complex pilot signals at time m, $S_{m,d}(t)$ and $S_{m,p}(t)$ are the signal waveforms $S_m(t)$ spread by the channelization code corresponding to data signals and pilot signals respectively as expressed in below equation 4, and $x_d(t)$ and $x_p(t)$ are the transmitted signal waveforms x (t) spread by the channelization code corresponding to data signals and pilot signals respectively.

$$S_m(t) = \sum_{i=0}^{N_{SF}-1} w_{ch}[i]C_{scr}[i+mN_{SF}]p_c(t-iT_c)$$

Eq. 4

In Eq. 4, $N_{SF}$ is a constant representing the spreading gain.

Figure 4:
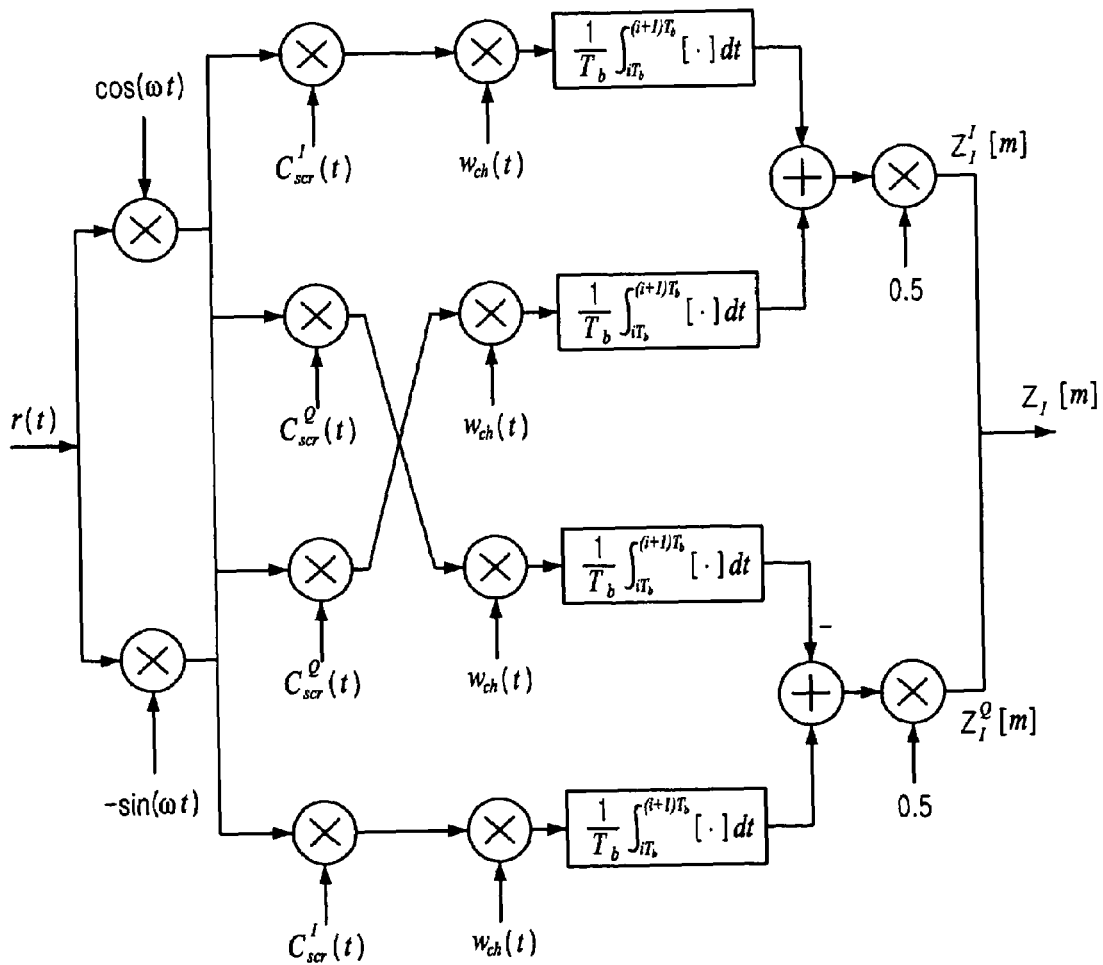
FIG. 4 is a diagram illustrating a receiving of a WCDMA forward system in accordance with a preferred embodiment of the present invention.

FIG. 4 is a diagram illustrating a receiver of a WCDMA forward system in accordance with a preferred embodiment of the present invention. The transmitter sends a signal via Rayleigh fading channel and Complex white Gaussian noise channel to a receiver.

The received signal at the receiver can be expressed as:

$$r(t) = \sum_{l=1}^{L} \sum_{m=0}^{N_d/2-1} \alpha_l[m]\exp(j\theta_l[m])(b_d^I[m] + jb_d^Q[m])s_{m,d}(t-mT_s-\tau_l) + \sum_{l=1}^{L} \sum_{m=0}^{N_d/2-1} \alpha_l[m]\exp(j\theta_l[m])(b_d^I[m])s_{m,p}(t-mT_s-\tau_l) + n(t)$$

Eq. 5

In Eq. 5, $\alpha_l[m]$ and $\theta_l[m]$ are the complex fading coefficients of the $l^{th}$ path matching the signal m and corresponding to amplitude variation and phase change respectively, and n(t) is the complex Additive white Gaussian noise A WGN with a two-sided power spectral density $N_0/2$.

Referring to FIG. 4, the decision statistics $Z_l[m]$ is obtained by demodulation. The decision statistics $Z_l[m]$ is expressed as:

$$Z_l[m] = \alpha_l[m]\exp(j\theta_l[m])(b^I[m]+jb^Q[m])+n[m]$$

Eq. 6

The decision statistics $Z_l[m]$ includes the two components $Z_{d,l}[m]$ and $Z_{p,l}[m]$ corresponding to data signals and pilot signals respectively. It is expressed as:

$$Z_l[m] = Z_{d,l}[m] + Z_{p,l}[m]$$

Eq. 7

$Z_{d,l}[M]$ is a component of the decision statistics corresponding to data signals and it is defined as:

$$Z_{d,l}[m] = \alpha_l[m]\exp(j\theta_l[m])(b_d^I[m]+jb_d^Q[m])+n_d[m]$$

Eq. 8

$Z_{p,l}[m]$ is a component of the decision statistics corresponding to pilot signals and it is defined as:

$$Z_{p,l}[m] = \alpha_l[m]\exp(j\theta_l[m])(b_p^I[m]+jb_p^Q[m])+n_p[m]$$

Eq. 9

In Eq. 9, $n_d[m]$ and $n_p[m]$ are the noise components corresponding to data signals and pilot signals respectively.

As described below in accordance with an embodiment of the present invention, the decision statistics $Z_{d,l}[m]$ and $Z_{p,l}[m]$ are inputted into the channel estimation apparatus.

FIG. 5 is a diagram illustrating a channel estimation apparatus. Referring to FIG. 5, the channel estimation apparatus includes a multiplier 100, a moving average filter 102, an interpolation unit 104, a signal delay unit 106, a channel tentative estimation compensation unit 108, a decision block unit 110, a raw channel estimation unit 112, a non-linear filter 114, and a final channel estimation compensation unit 116.

The multiplier unit 100 multiplies an input signal by a reference pilot signal.

The moving average filter 102 calculates an average value of pilot signals.

The interpolation unit 104 computes a tentative estimation value of channel variation by using the linear interpolation algorithms based on the average value of pilot signals.

The channel compensation unit 108 compensates the channel variation of the data signals delayed a predetermined time based on the tentative estimation value of channel variation.

The decision block unit 110 determines tentative data signals based on the compensated data signals in the channel compensation unit 108.

The raw channel estimation unit 112 computes the raw channel estimation based on the output signal of the signal discriminating unit 110 and the data signals delayed a predetermined time.

The non-linear filter 114 computes a final estimation value of channel variation based on the tentative estimation value of channel variation and the raw channel estimation value.

The final channel estimation compensation unit 116 compensates the data signals based on the final estimation value of channel variation.

Since the receiver already knows information regarding to reference pilot signals at time m, a decision statistics of the pilot signals, $Z_{p,l}[m]$ can be expressed as:

$$\overline{Z}_{p,l}[m] = Z_{p,l}[m]R_{p,l}^*[m] \qquad \text{Eq. 10}$$

In Eq. 10, $R_{p,l}[m]$ is the reference pilot signals at time m and $R_{p,l}^*$ is the complex conjugate of $R_{p,l}$. That is, $\overline{Z}_{p,l}[m]$ is used as the decision statistic of the pilot signal by multiplying the reference pilot signals $R_{p,l}^*[m]$ at the multiplier unit 100.

The decision statistics $\overline{Z}_{p,l}[m]$ contains distortion components by the fading channel of the $l^{th}$ path and signal AWGN channel. In the moving average filter 102, the average value of $\overline{Z}_{p,l}[m]$ is computed as expressed in the following equation 11 and the average value is used for computing an estimation value of the channel variation in a pilot signal region of $k^{th}$ slot.

$$h_k = \frac{1}{N_p} \sum_{m=0}^{N_p-1} \overline{Z}_{p,l}[m] \qquad \text{Eq. 11}$$

The interpolation unit 104 computes the tentative estimation value of channel variation $h_k$ of $N^{th}$ data signal of the $k^{th}$ slot by using the linear interpolation algorithms using two estimation values of channel variation $h_{k-1}$ and $h_k$. $\hat{h}_{k,n}$ can be expressed as:

$$\hat{h}_{k,n} = h_k + n\frac{h_k - h_{k-1}}{N_d + 1} \qquad \text{Eq. 12}$$

The tentative estimation value of channel variation ĥk,n is inputted into the channel compensation unit 108 and is used to compensate the decision statistics $Z_{d,l}[m]$ signal. It is expressed as:

$$\overline{Z}_{d,j}[m] = Z_{p,l}[m] \cdot \hat{h}_m^* \qquad \text{Eq. 13}$$

The compensated decision statistics $\overline{Z}_{d,j}[m]$ can be divided into in-phase and quadrature-phase components by following equation as:

$$\overline{Z}_{d,j}[m] = \overline{Z}_{d,l}^I[m] + j\overline{Z}_{d,l}^Q[m] \qquad \text{Eq. 14}$$

The decision block unit 110 tentatively determines the data signal expressed as:

$$\hat{b}_d^I[m] = sgn(\overline{z}_d^I[m]), \hat{b}_d^Q[m] = sgn(\overline{z}_d^Q[m]) \qquad \text{Eq. 15}$$

The output signal of the signal decision block unit 110 is inputted into the raw channel estimation unit 112 and is multiplied by the decision statistics $Z_{d,l}[m]$ for the data signals associated with the prescribed time delay induced by a signal delay unit 106.

In the decision block unit 110, the raw channel estimation value $\tilde{h}_{l,k,n}$ for the $n^{th}$ signal of the $k^{th}$ slot in the $l^{th}$ path can be expressed as:

$$\tilde{h}_{l,k,n} = Z_{d,l}[m] \cdot \hat{b}_d^*[m]. \qquad \text{Eq. 16}$$

The tentative estimation value of channel variation $\hat{h}_k$ computed in the interpolation unit and the raw channel estimate value $\tilde{h}_{l,k,n}$ in the decision block unit 110 combine to compute the final estimation value of channel variation by using the non-linear filter unit 114.

The non-linear filter 114 is a tapped delay line TDL-type filter. Assuming that the total number of taps available in the non-linear filter unit 114 is I, the filter coefficient of each tap should be around 1/I.

The non-linear filter 114 computes the final estimation value of channel variation by computing the tentative estimation value of channel variation only in a case that index is 0 and computing all raw channel estimation values in a case that index is not 0. It can be expressed as:

$$y_k[n] = \sum_{i=1}^{(I-1)/2} w_{i-(I-1)/2}\tilde{h}_{k,n+1-i} + w_0\hat{h}_{k,n-(I-1)/2} + \sum_{i=1}^{(I-1)/2} w_i\tilde{h}_{k,n-i-(I-1)/2} \qquad \text{Eq. 17}$$

In Eq. 17, $\hat{h}_{k,n}$ and $\tilde{h}_{k,n}$ are the estimation value of channel variation corresponding to the tentative estimation value of channel variation and the raw channel estimation value respectively for the $n^{th}$ signal of the $k^{th}$ slot.

The channel estimations made at each finger combine to compute the final channel estimation before final decisions for data signals are performed.

As mentioned above, the signal compensation unit 116 compensates the decision statistics $Z_{d,l}[m]$ of the data signals delayed in a predetermined time by using the final estimation value of channel variation computed in the non-linear filter 114, resulting in which the decision statistics $Z_{d,l}[m]$ of the received data signals determines data signals transmitted from the transmitter.

As described in the above embodiment of the present invention, the present invention proves practically feasible and performs better than conventional PADD algorithms.

Figure 6A:
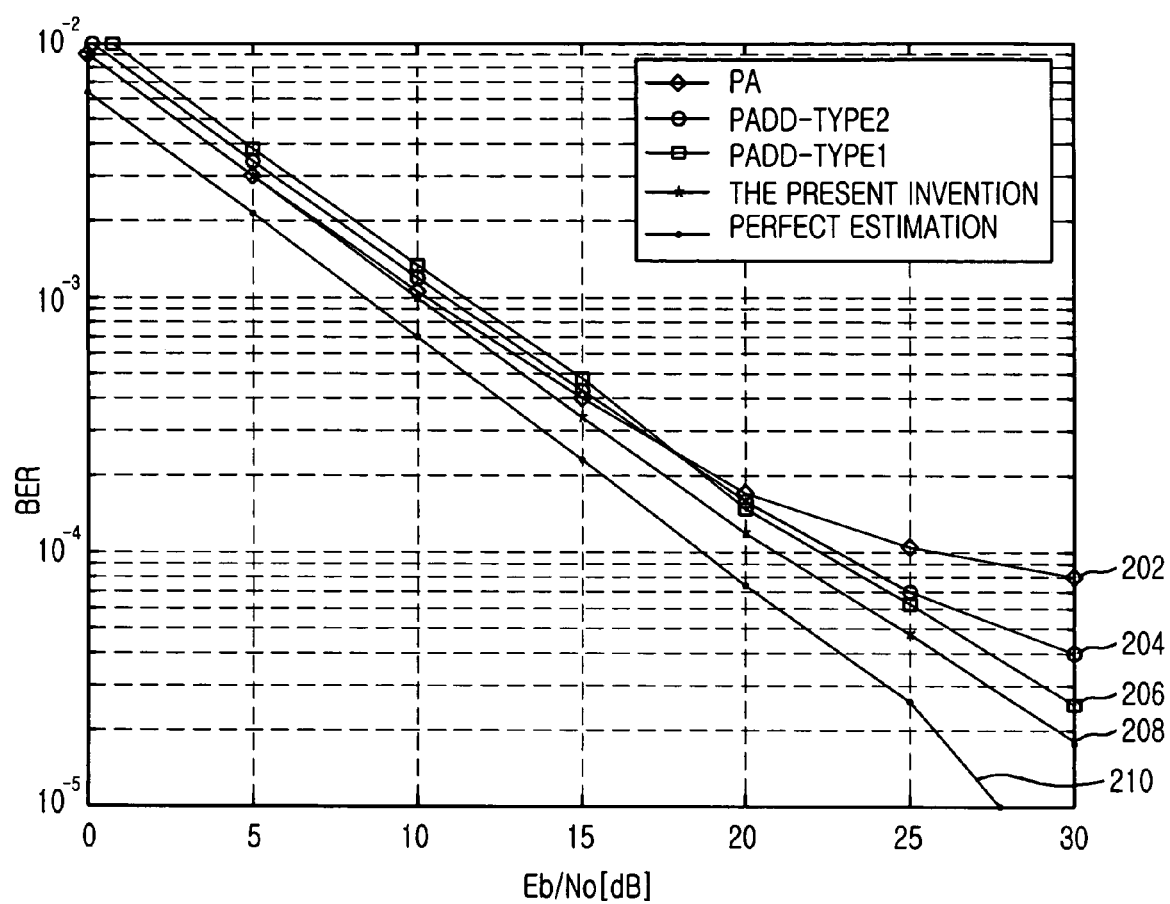
FIGS. 6A and 6B are graphs showing a performance of a receiver with a built-in channel estimation apparatus in accordance with a preferred embodiment of the present invention.
Figure 6B:
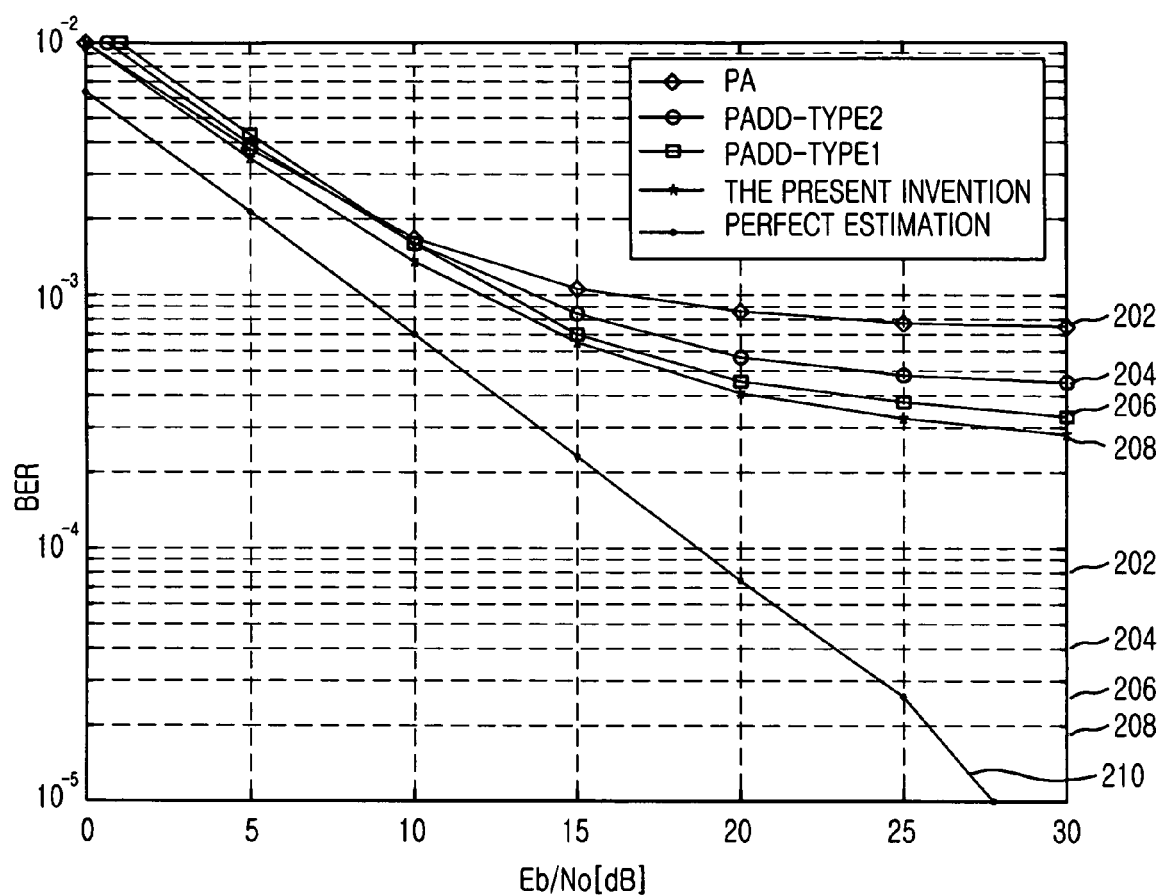

FIGS. 6A and 6B are graphs showing the performance of a receiver with a built-in channel estimation apparatus in accordance with a preferred embodiment of the present invention. In the FIGS. 6A and 6B, the bit error rates (BERs) are evaluated when the signal-to-noise ratio (SNR) varies between 0 dB and 30 dB and the mobile speed is 120 km/h and 250 km/h respectively.

Referring to FIGS. 6A and 6B, a performance curve 208 of the channel estimation apparatus in accordance with the present invention is below than a performance curve 202 of the conventional channel estimation apparatus using PA algorithms and performance curves 204 and 206 of the channel estimation apparatus using conventional PADD algorithms. In addition, the performance curve of channel estimation apparatus proposed by the present invention is very close to the ideal performance curve 210.

It means the present invention outperforms other algorithms.

While the present invention has been described with respect to certain preferred embodiments, it will be apparent to those skilled in the art that various changes and modifications may be made without departing from the scope of the invention as defined in the following claims.

What is claimed is:

1. An apparatus for channel estimation by using a non-linear filter, comprising:
   a multiplier for multiplying an input signal by a reference pilot signal;
   a filter for calculating the average value of pilot signals;
   an interpolator for computing a tentative estimation value of channel variation by using linear interpolation algorithms based on the average value of pilot signal;
   a tentative channel estimation compensator for compensating a channel variable of the data signal delayed in a predetermined time based on the tentative estimation value of channel variation;
   a decision block unit for tentatively determining a sign of data signal based on the compensated data signals;
   a raw channel estimator for computing a raw channel estimation value based on the output signal of the decision block unit and the data signal delayed in a predetermined time; and
   a non-linear filter for computing a final channel estimation value of channel variation based on the tentative estimation value of channel variation and the raw channel estimation value.

2. The apparatus as recited in claim 1, wherein the non-linear filter includes a plurality of taps for computing the final estimation value of channel variation by combining output signals from the taps, wherein the non-linear filter is formed by one tap for providing a weight to the tentative estimation value of channel variation and other taps for providing a weight to the raw channel estimation value.

3. The apparatus as recited in claim 2, wherein the weight is an inverse of the number of taps in the non-linear filter.

4. A method for making channel estimations using a non-linear filter, the method comprising the steps of:
   a) calculating the average value of pilot signals;
   b) computing a tentative estimation value of channel variation by using a linear interpolation algorithms;
   c) compensating the channel variation of the data signal delayed in a predetermined time based on the tentative estimation value of channel variation;
   d) tentatively determining a sign of data signal based on the compensated data signal;
   e) computing a raw channel estimation value based on the data signal delayed in a predetermined time; and
   f) computing the final channel estimation value of channel variation using a non-linear filter based on the tentative estimation value of channel variation and the raw channel estimation value.

5. The method as recited in claim 4, wherein the non-linear filter includes a plurality of taps for computing the final estimation value of channel variation by combining output signals from the taps, wherein the non-linear filter is formed by one tap for providing a weight to the tentative estimation value of channel variation and other taps for providing a weight to the raw channel estimation value.

6. The method as recited in claim 5, wherein the weight is an inverse of the number of taps in the non-linear filter.

* * * * *

UNITED STATES PATENT AND TRADEMARK OFFICE
CERTIFICATE OF CORRECTION

PATENT NO. : 7,181,185 B2 Page 1 of 1
APPLICATION NO. : 10/737223
DATED : February 20, 2007
INVENTOR(S) : Jung-Keun Park and Joong-Hoo Park It is certified that error appears in the above-identified patent and that said Letters Patent is hereby corrected as shown below:

At column 3, line 46, please insert -- $= x_d(t) + x_p(t)$ -- after "$(t - mT_b)$".

At column 4, line 13, please insert -- $+ jb_d^Q[m]$ -- after "$(b_d^J[m]$".

At column 5, line 47, please delete "$\hat{h}k,n$" and insert -- $\hat{h}_{k,n}$ --.

Signed and Sealed this

Thirteenth Day of November, 2007

JON W. DUDAS
*Director of the United States Patent and Trademark Office*